Oct. 11, 1955     J. E. SHEPHERD ET AL     2,720,647

RADIO RANGE INDICATING SYSTEM

Original Filed April 30, 1942     4 Sheets-Sheet 1

INVENTORS
GIFFORD E. WHITE
JAMES E. SHEPHERD
BY
Paul B. Hunter
ATTORNEY

INVENTORS
GIFFORD E. WHITE
JAMES E. SHEPHERD
BY
ATTORNEY

United States Patent Office 2,720,647
Patented Oct. 11, 1955

2,720,647

RADIO RANGE INDICATING SYSTEM

James E. Shepherd, Hempstead, N. Y., and Gifford E. White, Woodland Hills, Calif., assignors to Sperry Rand Corporation, a corporation of Delaware Original application April 30, 1942, Serial No. 441,188. Divided and this application March 17, 1948, Serial No. 15,398

9 Claims. (Cl. 343—13)

The present invention is concerned with radio-directed fire control systems especially adapted for use in aircraft and against other fast moving aircraft.

The present application is a divisional of copending application Serial No. 441,188, filed in the United States Patent Office on April 30, 1942 now U. S. Patent 2,617,-982 granted November 11, 1952.

For the protection of large aircraft, such as heavy bombers, it is known to use flexible gun turrets movable independently of the craft in association with a computing gun sight or computer which is manually tracked with the target and thereby derives the proper gun aiming data for controlling the gun turrets. Up to the present time, however, such inter-aircraft fire control devices, and also anti-aircraft fire control devices, have relied upon visual tracking of the target for determining the correct gun aiming angles. Such prior art systems are subject to the well known limitations of visual sighting, such as reliance upon proper weather and visibility conditions, upon sufficient lighting, and upon the restricted range of optical telescopes. Even under optimum conditions of visibility, the visual detection of the approach of aircraft and visual tracking with aircraft have been difficult and uncertain. For instance, aircraft approaching from the direction of the sun can be seen only with the greatest difficulty. Furthermore, the observer cannot scan the whole zone of danger quickly and carefully with certainty by the eye alone.

In order to overcome these and other disadvantages of the prior systems, the invention of parent application Serial No. 441,188 provides a system in which the target is detected, located, and tracked by a radio beam which effectively replaces the visual line of sight of prior systems. However, before describing the present system, certain essential requirements for such a system will be discussed.

Firstly, the defending aircraft must be appraised of the presence and approximate direction or orientation of all targets in its vicinity in order to be able to effectively plan and accomplish its defense. In addition, it is desirable that the approximate range of each of these various targets should be indicated simultaneously with its location, for similar reasons. After having been warned of the presence, orientation, and range of these targets, and after having chosen one or more of them as of greater importance for immediate engagement, it is necessary for the particular target selected to be tracked by the fire control system in order to determine the target's present position, such as defined by its elevation, azimuth, and range, in the present case, and to determine the rate of change of position, as defined by target elevation rate and azimuth rate, in order that the correct gun aiming angles for controlling the guns and turrets may be derived by the computer.

In order to relieve the fire control officer of as much of the burden of tracking as is reasonably possible, it is desirable to automatically track with the target, at least in elevation and azimuth, and possibly also in range, so as to automatically set into the computer mechanism the proper target position and target rate data.

The present system offers an improved type of range measuring warning system for use in combination with several types of tracking or fire control systems. Preferably, since space and weight are at a premium in aircraft, these various systems are combined as much as possible to use a minimum amount of equipment.

Accordingly, by the present system there is provided apparatus for indicating the range of any selected target within a predetermined portion of space.

Upon selection of a particular target, as shown in parent application Serial No. 441,188, any one of three different types of tracking systems may be used: (1) a system in which the fire control officer actuates the computer setting in such a manner as to maintain a radio line of sight in track with a target, (2) a system in which a radio line of sight is automatically tracked with a target and the fire control officer actuates a computer to maintain it in synchronism with the radio line of sight, and (3) a fully automatic system in which a radio line of sight is automatically maintained in synchronism with the target and serves to automatically set into the computer the proper target data required by the computer.

By such a system both the warning and tracking may be performed entirely independently of any optical visibility conditions and at a much greater range than was formerly possible, without impairing in any way any of the desirable features of former types of fire control systems.

In addition, the operation of the present system is made to agree in substantially all operations to be performed with the operation of prior systems and the natural instinctive reactions of the operator are utilized by the provision of controlling operations which are naturally dictated by the circumstances encountered.

It is an object of the present invention to provide improved radio-operated gun control systems.

It is still another object of the present invention to provide improved radio-directed gun control systems for determining the range of a target.

It is a still further object of this invention to provide a system for measuring the range of or distance to a selected target employing a visual indicator for the guidance of the operator in making the measurement.

A further object of the present invention resides in providing a system of the foregoing character in which two electrical waves are phase compared by generating a local wave in timed relation to one of said electrical waves and matching it with the other of said electrical waves on the screen of a cathode ray tube whereby to provide a measure of the relative phase of the two electrical waves or a measure of the time difference therebetween.

It is a further object of the present invention to provide apparatus for measuring the time difference between a first radio wave and a second radio wave, related in time to the first wave, by means of a cathode ray tube wherein a base trace is produced on the face of the tube in time relation with the first wave, a reference or index square wave being also produced in time relation with the first wave and of greater length than the second wave such that, when applied to the deflecting means of the cathode ray tube, the index wave representation has a flat top portion which is displaced from and is parallel to the base trace and the second wave representation is in the form of a pip extending substantially perpendicularly from the base trace, and wherein phase-adjusting means is provided for adjusting the phase relation between the index wave and the second wave whereby their representations may be relatively shifted so as to place the second wave representation at a prescribed position on the flat top portion of the index wave representation, and further means, operable with the phase-adjusting means, is provided for producing a measure of the time difference between the first and second wave when the index and second wave representations are so positioned.

Another object resides in providing a system of the foregoing character embodying a cathode ray tube, on the screen of which the reflected pulses and a reference wave may be relatively shifted so as to be matched or so predeterminately positioned with respect to each other as to provide a measure of range to the target.

Another object resides in providing a range measuring system in which the appearance of a chosen reflected pulse on the screen of a cathode ray tube may be variably modified there along so that, when modified in a prescribed manner, the means by which it is so modified will provide an indication of the range to the target reflecting said pulse.

It is a further object of the present invention to provide improved devices for setting a member, such as a range control member of a computer, in accordance with the distance or range to a distant object.

Other objects and advantages of the present invention will become apparent from the following specification and drawings, in which.

Although we have herein described our invention in connection with a gun control system and particularly in connection with a more comprehensive system, more fully described in parent application Serial No. 441,188, it is to be understood that our present invention is not necessarily limited to such use but may be employed in other indicating systems involving different parameters.

As discussed above, the system to which the present invention relates is adapted for two major types of operation, namely (1) a searching operation for roughly indicating the position and/or distance of any targets within the field of operations of the device and (2) a tracking operation in which a particular target may be selected and followed by the device for properly directing a gun thereat. Three alternative types of tracking operation, known as "manual," "semi-automatic," and "full automatic" tracking may be used.

For describing generally these various types of operation, recourse is had to Figs. 1–4, more specific details of the system being described with respect to later figures.

Figure 1:
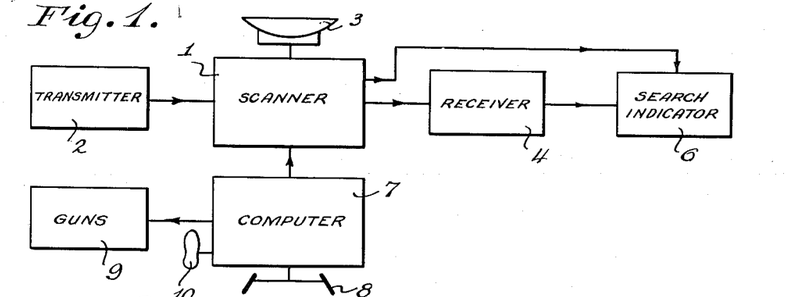
Fig. 1 shows a block or flow diagram of the system of the invention during searching operations.

Fig. 1 shows a block or flow diagram of the present system when operating during searching. In this system, a scanner 1 projects a sharply directive beam of radiant energy, such as 19 in Fig. 6, obtained as from a suitable transmitter 2 and directive antenna arrangement 3. This beam comprises a periodic sequence of short duration pulses of high frequency energy, and during searching is swept in a spiral cone over a predetermined solid angle, which is preferably substantially a hemisphere, in such manner that the radiant energy is projected at some time during its cycle into every part of the solid angle. Should any object or target be located in this solid angle, the projected radiant energy will be reflected therefrom when the beam is directed thereat, and will be received in the same antenna system 3, which acts dually as a transmitting and a receiving system.

This reflected series of pulses of high frequency energy is received in a radio receiver 4 whose output actuates a suitable indicator 6. This indicator, as will be described below more in detail, is preferably a cathode ray tube whose electron beam trace is caused to sweep in spirals in synchronism with and instantaneous correspondence with the spiral scanning motion of the scanner. For this purpose the indicator 6 is also controlled from scanner 1. The received reflected pulse is caused to momentarily brighten the trace of the beam and thereby produce on the cathode ray screen an indication of the existence and approximate orientation of the reflecting object. The approximate range of the reflecting object may also be shown.

The orientation of the scanner 1, which may be taken to be the orientation of the polar axis of the spiral conical scanning motion, is placed under the control of a computer 7, whose elevation and azimuth settings may be manually actuated from a suitable manual control 8. Computer 7 is adapted to calculate the proper gun aiming angles for intercepting the target by a projectile when the computer is set in accordance with the present target position data, such as elevation, azimuth and range of the target, and in accordance with the rate of change of the present target position, such as elevation rate and azimuth rate. A suitable form for such a computer is shown more in detail in copending application Serial No. 411,186, for Inter-aircraft Gun Sight and Computer, filed September 17, 1941, in the names of C. G. Holschuh and D. Fram, now abandoned. As is shown in this copending application, the range setting of computer 7 may be performed by a suitable foot pedal 10. The orientation control is effected by a handle bar control 8 whose displacement about two independent axes represents a combination of the displacement and rate of change of displacement of azimuth and elevation settings of computer 7, providing aided tracking. In operation, the controlling officer actuates control 8 so as to maintain the present target position setting of the computer 7 in track with the target, as evidenced (in the prior application) by a suitable optical sighting arrangement. By so doing, the proper target elevation, target azimuth, target elevation rate and target azimuth rate are set into the computing mechanism 7 together with the range data set in by foot pedal 10, whereby computer 7 may determine the gun aiming angles. In the present system, the same operations are performed, but utilizing a different type of indicator to show the proper tracking conditions, as will be described.

The scanner 1 is suitably controlled, as will be seen hereinafter, in accordance with the target elevation and target azimuth setting of computer 7. The gun aiming angles determined by computer 7 are used to suitably control the orientation of one or more guns or turrets 9, which are thereby rendered effective against the target.

A suitable type of gun control apparatus for orienting the guns 9 under the control of the computer 7 is shown in copending application Serial No. 424,612, for Hydraulic Remote Operating Systems, filed December 27, 1941, in the names of E. L. Dawson, F. M. Watkins and C. N. Schub, Jr., which issued on July 27, 1948 as U. S. Patent No. 2,445,765. It is to be noted that the present system is not confined to the use of this particular type of gun control apparatus, but that any other suitable type of remote control system may also be used. If desired, the guns 9 need not be directly controlled from computer 7 but may be locally controlled in accordance with suitable indications transmitted from computer 7 in any well known manner.

The system as shown in Fig. 1 is not intended for use as the actual gun control system but is merely intended to search out possible targets and to enable the scanner to properly locate a target for the purpose of later tracking with it. For this reason, the control from computer 7 to guns 9 is shown dotted in Fig. 1. After a target is observed on the screen of cathode ray indicator 6, the manual control 8 of computer 7 is actuated to adjust the orientation of scanner 1 to the position where this orientation coincides as closely as possible with the orientation of the desired target, as evidenced by the position of the bright spot indication on the indicator screen. When this adjustment has been made, the system is ready to change-over to the tracking operation.

The system is adapted to use three separate and distinct types of tracking, any one of which may be selected at the option of the fire control officer. It is to be noted that each of these types of tracking system may be used independently of the others if desirable. For all of these types of tracking operation, scanner 1 is energized from transmitter 2 by the same type of periodic pulse wave as described with respect to the searching operation. However, scanner 1 no longer performs spiral scanning as in Fig. 1 but instead it is converted to perform a narrow circular conical scanning with a very small apex angle. Preferably, this angle is of the order of the angular width of the radiation and reception pattern derived from antenna 3, indicated in Figs. 6, 7 and 7A.

Figures 5, 6, 7, 7A, 8, 8A:
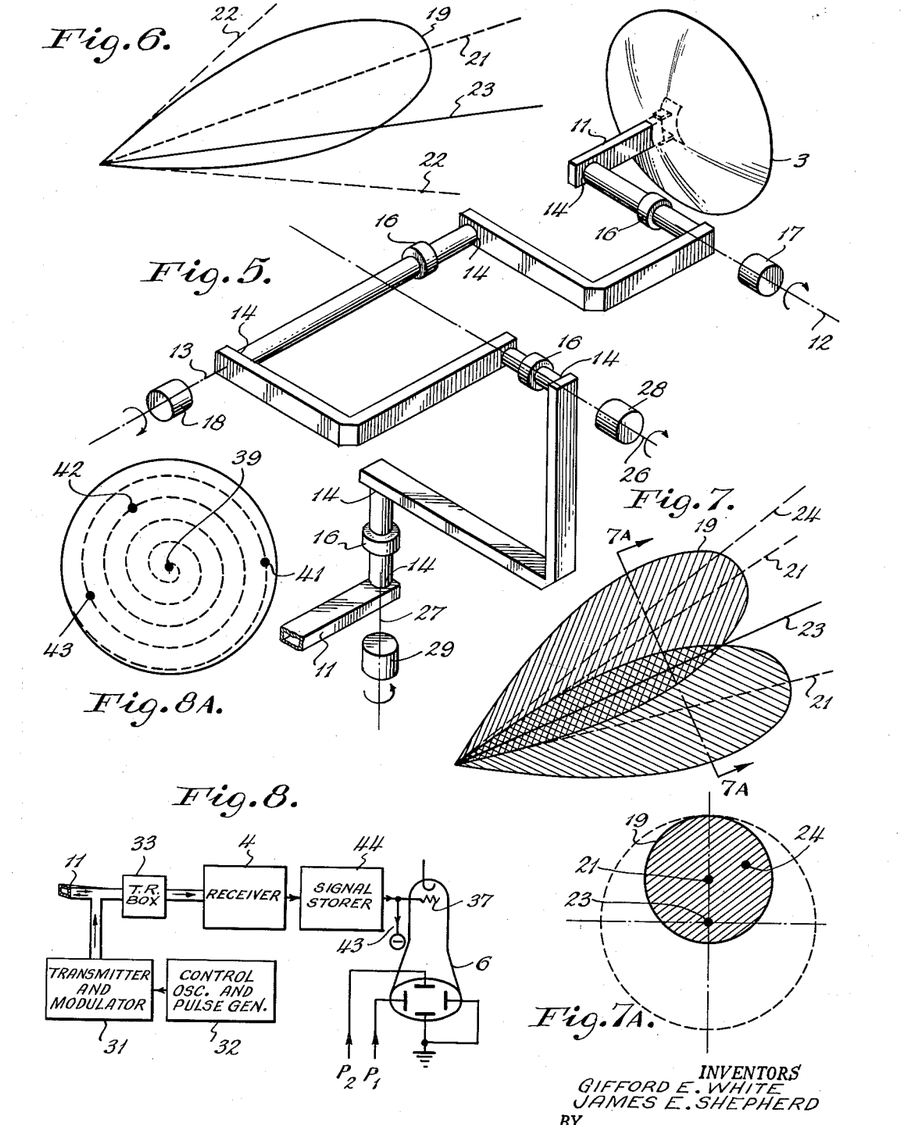
Fig. 5 shows a schematic perspective view of one form of scanner useful in the present system.
Fig. 6 shows the radiation pattern of the directive antenna array used with the scanner of Fig. 5.
Fig. 7 shows a longitudinal cross-sectional view of the radiation pattern of the scanner of Fig. 5 during any of the tracking operations.
Fig. 7A is a cross-section of Fig. 7 taken along lines 7A—7A thereof.
Fig. 8 shows a schematic block wiring diagram of one form of radio transmitting, receiving and indicator circuit for searching operations.
Fig. 8A shows a representative view of the cathode ray screen of the indicator of Fig. 8.

Thus, if antenna system 3 is adapted to produce a beam of radiant energy having a directive radiation pattern such as 19 in Fig. 6 with a directivity axis 21 then, during tracking, beam 19 will be rotated by scanner 1 about an axis such as 23 in Fig. 7, whereby directivity axis 21 performs a conical motion about axis 23, which may be termed the tracking directivity axis since it is this axis which defines the radio line of sight, as will be seen. Preferably, radiation pattern 19 is made to have a small apex angle such as of the order of 4° in angular width between the half-power points. Then, during tracking, the cone described by axis 21 would preferably have an apex angle also of the order of 4°. In this manner, the useful portion of the radiant energy would be projected over a conical solid angle having an 8° apex angle. Energy reflected from an object or target within the field of this radiant energy will be received by antenna arrangement 3 and led thereby to receiver 4 whose output actuates the tracking indicator 6' to indicate the relative displacement between the scanner orientation defined by axis 23 and the orientation of the target.

Figure 2:
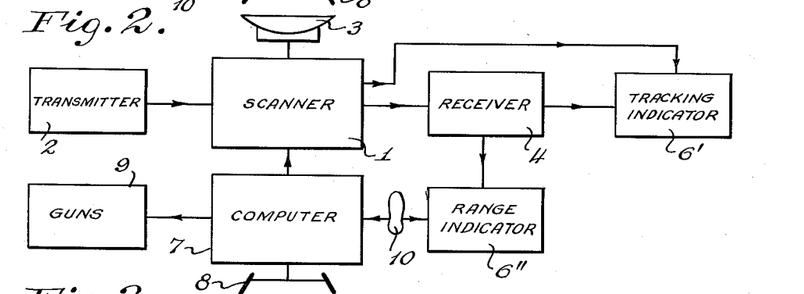
Fig. 2 shows a corresponding block diagram of the system during manual tracking operations.

In the system of Fig. 2, manual actuation of computer control 8 serves to set azimuth and elevation data into computer 7 and at the same time controls the orientation of scanner 1, as determined by axis 23, to assume the same azimuth and elevation as is set into computer 7, in the same manner as described with respect to Fig. 1.

In effect, the orientation of scanner 1 is made the same as the orientation of computer 7, the latter term meaning the orientation corresponding to the azimuth and elevation data set into the computer mechanism.

Also actuated from receiver 4 is a range indicator 6". A matching index is provided for indicator 6", as will be described more in detail below, which is placed under the control of range pedal 10 serving also to set range data into computer 7.

In operating the system of Fig. 2, the operator will, by his manual control 8, orient scanner 1 until the tracking indicator 6' shows that the target orientation coincides with the scanner orientation. At the same time, the operator actuates the range foot pedal 10 to match the range index to the indication produced by range indicator 6". When these conditions obtain, and are maintained even during the motion of the target, the operator will know that the proper data is set into computer 7 and that the guns 9 controlled from the computed output of computer 7 are directed at the correct aiming angles to intercept the target with a projectile, and he may therefore, by a suitable firing key or control, fire at the target.

This system is known as "manual tracking" since the operator, through his manual control 8 and foot pedal 10, directly actuates the scanner and computer 7 to track with the target as evidenced by indicators 6' and 6". The scanner 1, in effect, operates to produce a radio line of sight in the same way as the sighting telescope in a conventional anti-aircraft or inter-aircraft system operates to produce an optical line of sight, to enable the computer 7 to track with the present position of the target, whereby the proper gun aiming angles are determined.

Figure 3:
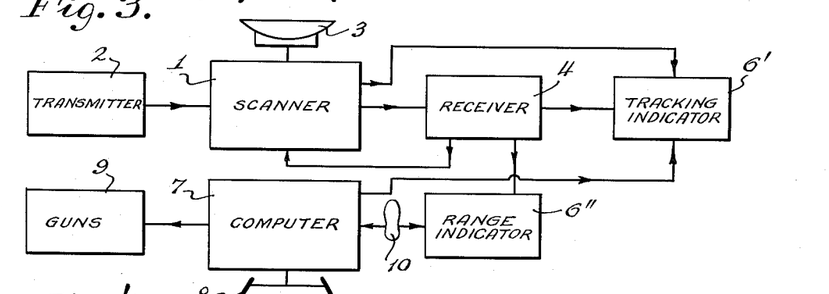
Fig. 3 shows a corresponding block diagram of the system during manual automatic operations.

A second type of tracking operation is illustrated in Fig. 3 and is termed "semi-automatic tracking." In this case the scanner 1, again performing circular conical scanning as described with respect to Fig. 2, is caused to automatically align its orientation with that of the target. This is done by using the reflected pulses received from the target to actuate suitable servo motors for orienting the scanner, which is thereby automatically oriented toward and tracks with the target. The computer 7 is again manually controlled from controls 8, in this instance to follow and track with the orientation of scanner 1. Thus, tracking indicator 6' in this type of system serves to indicate the displacement between the orientations of scanner 1 and computer 7, and computer 7 is actuated to maintain this "computer error" at zero. When this condition obtains, and with the proper computer range adjustment, similar to that described in Fig. 2, the output of computer 7, controlling guns 9, again represents the proper gun aiming angles and effective fire may be obtained from the guns.

Figure 4:
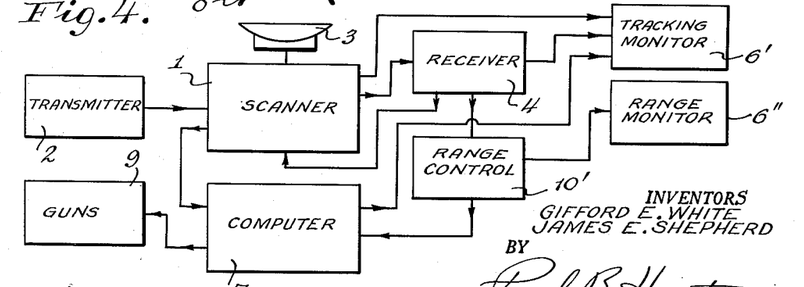
Fig. 4 shows a block diagram of the system during full automatic operations.

Fig. 4 shows the third or "full automatic" tracking system in which no manual actuation is necessary. Here, scanner 1 is automatically oriented toward the target, under the control of the output of receiver 4, as in Fig. 3, and, in addition, the "orientation" of computer 7 is caused to automatically follow the position of scanner 1 by a suitable servo mechanism. In this manner, the proper target azimuth and elevation data are set into the computer 7. The range adjustment of computer 7 is also automatically performed by a range control 10' under the control of receiver 4. This system, however, does not obtain the target rates, that is, elevation rate and azimuth rate, in the same manner as in Figs. 2 and 3.

In the system of Fig. 4, it is necessary to determine elevation rate and azimuth rate by actually measuring the angular rate of motion of the azimuth and elevation input controls of scanner 1. This may be done in any well known way, such as is shown and described in U. S. Patent No. 2,206,875, for Fire Control Device, issued July 9, 1940, in the name of E. W. Chafee et al. In this manner, all the required data may be set into computer 7 and therefore the guns 9 are automatically oriented at the proper gun aiming angles and automatically follow the target.

Indicator 6' in this instance merely serves as a monitor indicator to show how well the scanner 1 is following the target or, alternatively, how well the computer 7 is following and tracking with scanner 1. Indicator 6" serves similarly as a range monitor indicator.

The system is therefore capable of four alternative modes of operation, namely, searching, manual tracking, semi-automatic tracking, and full automatic tracking.

Fig. 5 shows a schematic representation of one suitable type of scanner 1. Thus, the scanner 1 may comprise a directive antenna system 3, shown as comprising a parabolic wave guide reflector, and energized through suitable electromagnetic wave guide connections 11 from transmitter 2. A suitable construction for scanner 1 is shown and described in copending application Serial No. 438,388, for Scanning Devices, filed April 10, 1942, in the names of L. A. Maybarduk, W. W. Mieher, S. J. Zand and G. E. White, which issued on November 12, 1946, as U. S. Patent No. 2,410,831. As therein disclosed, the antenna arrangement 3 in one form may be continuously "nodded" or oscillated at a slow rate about nod axis 12 which is itself rapidly and continuously rotated or "spun" about spin axis 13 thereby producing a spiral conical scanning pattern by the continuous widening of the conical sweeping about spin axis 13. To convert from the spiral searching scanning to the circular tracking scanning, the nod motion about the nod axis 12 is interrupted, with the orientation of the directive radiation or receptivity pattern axis 21 displaced slightly from the spin axis 13.

In order to feed radiant energy from wave guide 11 to the radiator 3, suitable stationary joints 14 and rotating joints 16 are provided as described more in detail in the above-mentioned copending application Serial No. 438,-388, (now U. S. Patent No. 2,410,831), and in copending application Serial No. 447,524, for High Frequency Apparatus, filed June 18, 1942 in the names of W. W. Mieher and J. Mallet, which issued on September 10, 1946 as U. S. Patent No. 2,407,318.

To provide the necessary control of tracking indicator 6' from scanner 1, in the manner to be described, suitable self-synchronous position transmitters are provided for producing signals indicative of the instantaneous position of the radiator 3 in nod and in spin, that is, indicative of the orientation of axis 21. The nod transmitter is indicated schematically at 17, the spin transmitter at 18. These transmitters may be of the well known "Selsyn," "Autosyn," or "Telegon" types.

Referring to Fig. 6, there is shown the radiation or receptivity pattern 19, of the antenna array 3 of Fig. 5. It will be noted that this radiation pattern 19 preferably is axially symmetrical about axis 21, and is substantially contained within a narrow solid cone 22, thereby forming a sharply directive beam of transmitted energy or a sharply directive reception pattern. Pattern 19 has been exaggerated for purposes of illustration, and preferably is very narrow, such as about 4° between the half-power points. During searching operations the axis 21 of this beam 19, by virtue of the combined effect of the nodding and spinning action of scanner 1, is caused to sweep out a spiral cone in space, the solid angle of this sweep being suitably chosen and ranging up to a complete hemisphere as desired. Preferably, the angular pitch of this spiral is chosen to be of the order of the effective angular width of the beam 19 whereby, during one complete spiral scan every portion of the conical solid angle will have had radiant energy projected to it, and radiant energy may be received from every such portion. The rates of nod and spin of the scanner of Fig. 5 are suitably chosen to provide a sufficiently short time interval for a complete scan, suitable for the purposes at hand.

During tracking operations the nod motion of scanner 1 is stopped at a position so that the axis 21 of maximum radiation or receptivity is displaced slightly from the spin axis 13 about which the radiation pattern 19 is rotated. In this way, as shown in Figs. 7 and 7A, energy of constant intensity is radiated or received along an axis 23 coincident with spin axis 13. However, along some other axis, such as 24, for example, maximum radiation and maximum receptivity is encountered only once during each spin cycle, resulting in a spin frequency modulation of waves received by reflection from an object oriented along axis 24.

The use of the same antenna arrangement for transmitting and receiving increases the sharpness of the resulting determinations since the over-all response pattern is the product of the radiation and receptivity patterns. If desired, however, a non-directional transmitter or receiver could be used with the described scanner acting respectively as a receiver or transmitter.

Conversion from searching to tracking scanning is effected, as described in application Serial No. 438,388 (now U. S. Patent No. 2,410,831), merely by energization of a suitable control solenoid. Other types of scanners are also described therein, requiring different apparatus for converting from searching to tracking, but all adapted to be used for searching or tracking in the same manner as the scanner of Fig. 5.

It may also be desirable to adjust the axis of this spiral scanning during the searching operation. For this purpose, scanner 1 may be provided with an elevation axis 26 and an azimuth axis 27 about which it may be suitably adjusted, in the manner described in application Serial No. 438,388 (now U. S. Patent No. 2,410,831), the control action being as described below. Also, suitable elevation and azimuth position transmitters 28 and 29 may be used, as will also be described below.

Fig. 8 shows one form of radio and indicator system for giving suitable indications during searching. Thus, assuming that the scanner of Fig. 5 is performing the spiral scanning described above, antenna array 3 is fed with radiant energy as over wave guide 11, from a transmitter and modulator unit 31. This transmitter 31 is adapted to produce high frequency radiant energy in any well known manner, and to modulate this high frequency energy by means of periodically recurring short duration pulses such as may be derived from a conventional control oscillator and pulse generator 32. There is thus radiated from the radiating arrangement 3 a sequence of short pulses of high frequency radiant energy. The frequency of control oscillator 32 and thereby the repetition frequency of the radiated pulses is chosen to have a suitably high value such that a substantial number of pulses is sent out during each spin rotation of the scanner 1 of Fig. 5. Suitable values for various constants of the circuits during this form of operation have been found to be the following: spin rotation, 1200 revolutions per minute; nod oscillation, 30 complete oscillations per minute; pulse repetition frequency, 2000 per second. With these values it will be seen that one complete cycle of spiral scanning will be accomplished each two seconds, one second being taken up in a spiral scan from zero nod to full nod, the other second of the cycle comprising the time for spiral scanning from full nod back to zero nod. During each half of the complete cycle 20 complete spin rotations are performed. Thus, for a full hemisphere of scan, the angular advance for each spin cycle will be approximately 4½ degrees, which is of the order of magnitude of the width of the radiation pattern 19 shown in Fig. 6. The pulse repetition rate of 2000 pulses per second gives 100 pulses per spin rotation, which thereby produces one pulse for each 3.6 degrees of motion of the radiation pattern 19 during scanning. Since the radiation pattern 19 is approximately 4 to 5 degrees wide, it will be seen that at least one pulse of radiant energy is transmitted to each point of the hemisphere.

Should a distant object be in the field of the system during radiation, at least one pulse will be incident thereon, and reflected therefrom. This reflected pulse or pulses will be picked up in the antenna arrangement 3 and conducted through wave guide 11 to the receiver unit 4 through a T-R box 33. T-R box 33 is adapted to pass the relatively low intensity received pulses but to block out the relatively high intensity transmitted pulses derived from transmitter 31. A suitable form for such a T-R box 33 is shown in copending application Serial No. 406,494 for Radio Apparatus for the Detection and Location of Objects, filed August 12, 1941, in the names of J. Lyman et al. and comprises, as is therein shown, an ionizable medium containing a spark gap within a resonant cavity which is resonant to the high frequency of transmission. The spark gap is so adjusted that the low intensity received waves are insufficient to create a discharge across the gap, whereas the high intensity transmitted pulses are sufficient to create such a discharge, which thereby ionizes the ionizable medium and effectively short circuits the wave guide 11 to these transmitted waves. In this manner the receiver unit 4 is effectively isolated from the high intensity transmitted pulses while being free to receive the pulses reflected from a distant object. Receiver unit 4 includes conventional pre-amplifying, detecting and wide-band amplifying units, all well known in the art, and is adapted to produce, in its output, signal currents or voltages corresponding to the wave shape of the envelope of the received reflected wave.

The received pulses are applied to the control grid 37 of the cathode ray tube indicator 6 shown in Fig. 8. Grid 37 is provided with a suitable bias, as by way of lead 38, such that, with no output from receiver 4, the cathode ray beam, produced by the usual means, is prevented from reaching the screen of the cathode ray tube indicator 6. However, this bias is also so adjusted that the received pulses 36 derived from the receiver unit 4 are permitted to momentarily render the electron beam trace visible on the screen of indicator 6. Thus, it will be clear that each time a reflected pulse is received a momentary bright spot occurs on the cathode ray screen.

In order to give an indication of the orientation of the reflected object with respect to the location of the system of the invention it is desirable to produce a spiral scanning of electron beam in synchronism with and corresponding instantaneously to the spiral scanning of the radiation and reception pattern 19. Suitable devices for obtaining deflecting voltages which will produce such a spiral scanning are shown in Figs. 9 through 12. Assuming, for the moment, that such spiral sweep voltages, designated as $P_1$ and $P_2$, have been obtained, these voltages $P_1$ and $P_2$, to be hereafter described more in detail, are impressed upon respective pairs of deflecting plates of the cathode ray indicator 6 and produce a spiral scanning of the electron beam such that at each instant the orientation of the latent trace of the beam on the screen of the cathode ray indicator 6 with respect to the screen center or pole 39 of Fig. 8A, corresponds to the instantaneous orientation of the beam axis 21 of antenna array 3 of scanner 1. Under these conditions the momentary brightening or intensifying of the electron beam under the control of receiver 4 will produce a momentary bright spot such as 41 shown in Fig. 8A. If a plurality of objects having different orientations are within the effective field of the searching system further bright spots such as 42 and 43 will also be produced, each having an orientation with respect to pole 39 respectively corresponding to the orientation of the corresponding reflecting object with respect to the spin axis 13 of the scanner 1.

As described above, the transmitted pulses and hence the reflected pulses are of quite short duration, such as the order of 1 microsecond. In order that the bright spots 41, 42 and 43 may be more clearly shown it is desirable to let the beam impinge upon the screen for a longer interval. For this purpose a signal storer 44 is inserted between receiver 4 and intensity control grid 37. This signal storer 44 may simply comprise a condenser-resistor network adapted to be instantaneously charged by a pulse derived from receiver 4 and which will maintain its charge beyond the duration of the pulse. However, the time constant of the signal storer 44 is preferably so chosen that this accumulated charge will be fully dissipated within a time not much longer than one recurrence period of the transmitted pulses in order that erroneous indications shall not be obtained. In this way the traces 41, 42, 43 are made brighter. In addition, the screen of indicator 6 is preferably made of high retentivity, so as to maintain its indication for a substantial interval after excitation is removed.

Figure 9:
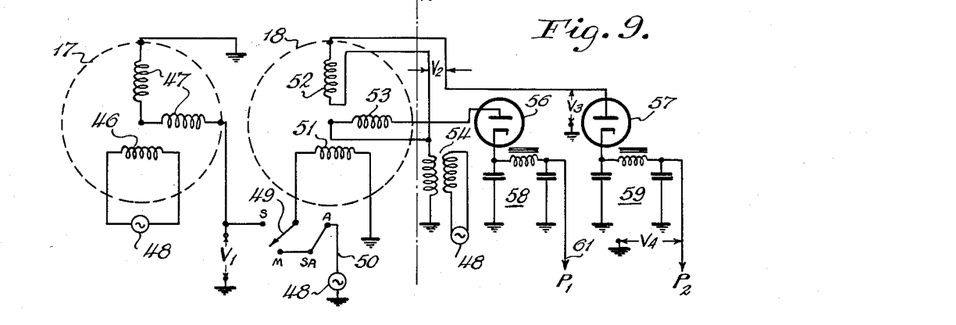
Fig. 9 shows a schematic circuit diagram of the spiral sweep or reference voltage generating apparatus for the circuit of Fig. 8.
Figure 10A:
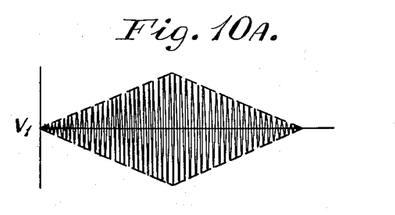
Figs. 10A, 10B, 10C, and 10D are voltage-time graphs useful in explaining the operation of the circuit of Fig. 9.

Fig. 9 shows one form of circuit for producing the spiral sweep voltages used with indicator 6 of Fig. 8. In this figure, nod transmitter 17 is indicated as being of a two-phase type having a single-phase energizing winding 46 and a two-phase secondary winding 47, in this instance connected in series to provide a single output. Winding 46 is energized from a suitable source 48 of alternating current. The output voltage appearing across the polyphase winding 47, namely voltage $V_1$ having wave shape as shown in Fig. 10A, will therefore be an alternating voltage having the frequency of source 48 and an amplitude varying in correspondence with the amount of nod, referred to the orientation of the scanner spin axis as zero nod. This wave is shown in Fig. 10A, being illustrated as having a linear change of amplitude with nod. It is to be noted that ordinarily this change of amplitude will be sinusoidal in character. However, by the use of proper motion converting devices whereby full nod motion corresponds to a small angular displacement of winding 46 with respect to winding 47, it may be made linear as illustrated. Preferably full nod is made to correspond to less than 45° rotation of transmitter 17, resulting thereby in substantially linear output as shown in Fig. 10A.

Figure 10B:
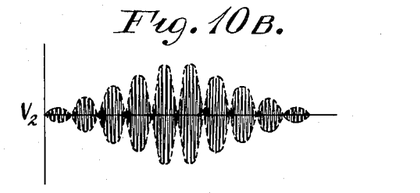

During searching operations, switch 49 will be connected to terminal S and hence the output voltage $V_1$ of nod transmitter 17 is fed to the single-phase winding 51 of the spin transmitter 18. The output from each of the two-phase windings 52 and 53 of spin transmitter 18 will then be the wave of Fig. 10A sinusoidally modulated in amplitude at the frequency of spin. This is shown in Fig. 10B for the winding 52. The winding 53, being displaced 90° in space with respect to winding 52, will have induced in it a voltage of similar wave shape but displaced 90° in phase at the spin frequency. In effect, spin transmitter 18 serves as a two-phase generator of spin frequency whose output amplitude is controlled by nod transmitter 17.

Figure 10C:
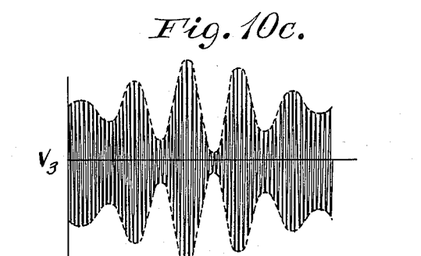
Figure 10D:
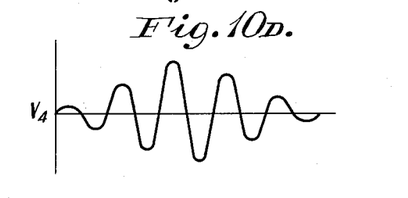

To each of these voltages output from windings 52 and 53 there is added a voltage of the frequency of source 48, as by way of transformer 54, producing the wave shown in Fig. 10C. It is to be noted that the wave of Fig. 10B represents in effect a suppressed-carrier modulated wave. The re-insertion of the carrier as by transformer 54 produces the usual modulated carrier wave shown in Fig. 10C. The resulting two waves are then rectified or detected in respective rectifiers 56 and 57 and filtered in filters 58 and 59 to produce the output voltages appearing on output leads 61 and 62 having the wave shape shown in Fig. 10D, namely, phase-displaced voltages of spin frequency modulated by the nod wave envelope.

These two voltages appearing on lines 61 and 62 will be phase displaced by 90° of the spin frequency. They will be termed the spiral sweep voltages $P_1$ and $P_2$, respectively. As is well known, if two voltages of equal amplitude and frequency, phase displaced by 90°, are impressed on the respective pairs of deflecting plates of a cathode ray tube, the resulting trace of the electron beam will be circular. By simultaneously varying the amplitudes of the two voltages the diameter of the circle will be varied.

In the present instance, by using the two waves $P_1$ and $P_2$ as the deflecting voltages, the beam will be caused to produce a circular pattern of constantly changing diameter and will thereby produce a spiral pattern similar to the pattern swept out in space by the scanner 1. It will, therefore, be clear that these voltages $P_1$ and $P_2$ are particularly suited for use in indicator 6.

During any of the three types of tracking, not transmitter 17 is disconnected from spin transmitter 18 by switch 49, which then connects winding 51 of spin transmitter 18 to a fixed source of alternating voltage, such as source 48, as by way of lead 50. In this case, output sweep voltages $P_1$ and $P_2$ will have constant amplitude, producing a circular trace on indicator 6, and accordingly will be termed "circular sweep voltages."

Figure 11:
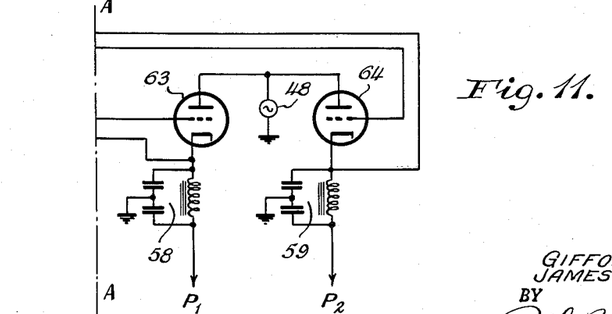
Fig. 11 shows a modification of a portion of the circuit of Fig. 9 to the right of line A—A thereof.

Fig. 11 shows an alternative circuit for inserting the carrier and demodulating the waves produced by spin transmitter 18 to produce the sweep voltages $P_1$ and $P_2$. Thus, here the respective outputs of windings 52 and 53 are impressed upon the grids of respective detector or demodulator tubes 63 and 64 whose plate circuits are energized simultaneously from alternating voltage source 48. By properly phasing the anode voltage with respect to the grid voltages, and by filtering out all carrier frequency components, as in filters 58 and 59, the same type of spiral sweep voltages $P_1$ and $P_2$ will be obtained as in Fig. 9.

Figure 12:
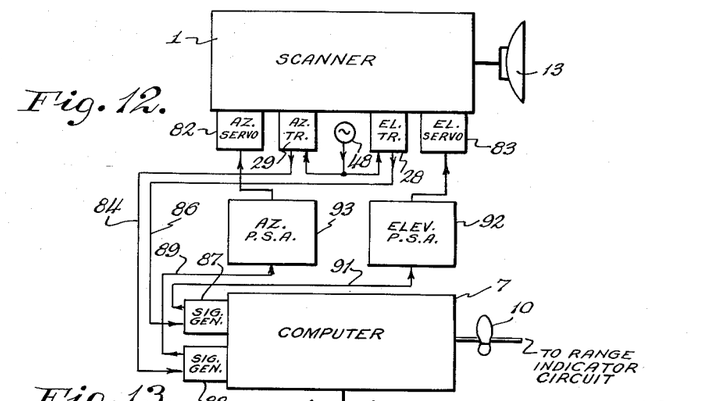
Fig. 12 shows a block circuit diagram of one form of apparatus for controlling the scanner orientation from the computer setting, as during searching or manual tracking operations.
Figure 13:
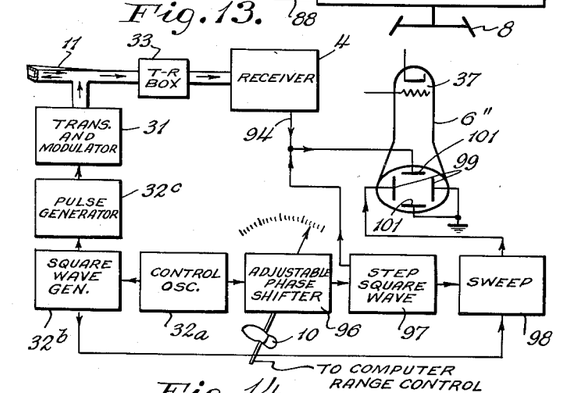
Fig. 13 shows a block circuit diagram of one form of range indicating system.
Figure 13A:
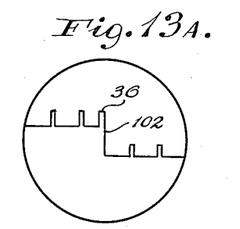
Fig. 13A shows a representative indication produced by the system of Fig. 13.

During spiral scanning and searching it is desirable to be able to adjust the orientation of the spin axis 13 of the scanner and, hence, to change the space orientation corresponding to the pole 39 of the indication shown in Figs. 8A or 13A. For this purpose, referring now to Figs. 12 and 5, scanner 1 is provided with azimuth and elevation servo devices, such as 82 and 83, respectively, adapted to actuate the scanner 1 about azimuth axis 27 and elevation axis 26, as shown in Fig. 5. These servo devices may be of any well known type adapted to position their outputs in accordance with suitable input voltages. Their details form no part of the present invention.

Also coupled to azimuth axis 27 is azimuth self-synchronous transmitter 29 of any conventional type, and correspondingly coupled to elevation axis 26 is elevation transmitter 28. As is well known, these transmitters 29 and 28 are provided with alternating voltage of a suitable frequency, such as from source 48, and their respective outputs 84 and 86 correspond to the instantaneous orientation of spin axis 13 in azimuth and elevation.

Computer 7 is also provided with similar self-synchronous devices 87 and 88 actuated respectively by the elevation and azimuth input settings of computer 7. These devices are connected to the outputs 84 and 86 of scanner transmitters 29 and 28 and serve as synchronous transformers or signal generators, as is well known, to produce in their outputs 89 and 91 alternating signal voltages corresponding in phase and magnitude to the sense and magnitude of relative displacement between the scanner orientation and the computer setting along the respective azimuth and elevation components. These outputs 89 and 91 control respective phase sensitive amplifiers 92 and 93 which thereupon control the respective servos 82 and 83 of the scanner 1 to reposition scanner 1 into correspondence with the setting of computer 7.

In this manner, by suitable control of computer 7, as by its manual orientation control 8, scanner 1 is caused to follow the orientation setting of computer 7 and its orientation may be thereby adjusted as desired.

The above action serves to set the orientation of the distant object or target in terms of its azimuth and elevation coordinates into computer 7, when the scanner and target orientations coincide. For proper operation of computer 7, however, to permit the determination of the correct gun aiming angles, it is also necessary to set therein data corresponding to the range of the target. For this purpose range pedal 10 is provided, which is actuated in the manner to be described.

As is well known, in a system of the present type using reflected pulses, the time interval or delay between the transmitted pulse and its corresponding reflected pulse is directly proportional to the distance or range of the reflecting object or target. Fig. 13 shows one type of indicating device useful for setting this range data into computer 7. Thus, control oscillator 32a serves to energize and synchronize a suitable wave squaring device 32b of any desired type producing a square wave output having the same frequency as that of control oscillator 32a. This output actuates a pulse generator 32c of conventional design suitable for deriving pulses for controlling the transmitter-modulator 31 which produces the transmitted pulses. The received reflected pulses are passed by T-R box 33 in the manner already described, and actuate the receiver 4 to produce in its output, such as 94, a signal voltage having a wave shape similar to the envelope of the received wave, which may comprise a series of pulses of different amplitudes occurring between successive radiated pulses.

Control oscillator 32a also feeds a variable phase shifter 96 of any suitable type whose output wave shape is then squared in a suitable wave squarer 97, which may be similar to wave squarer 32b, to derive a square wave output having a frequency identical with that of control oscillator 32a, but adjustable in phase position with respect thereto by means of phase shifter 96. It will thus be clear that the phase of the square wave output of wave squarer 97 is adjustable also with respect to the transmitted pulses and to the received pulses.

Wave squarer 32b also controls a conventional type of sweep circuit 98 to derive in its output a suitable sawtooth sweep voltage which is impressed upon the horizontal deflecting plates 99 of cathode ray indicator 6" to provide the time base trace for the indications to be described. The sweep voltage preferably is constant for a half-cycle and varying during the other half cycle whereby only a half-period is indicated on the screen of indicator 6".

The outputs of receiver unit 4 and of wave squarer 97 are combined suitably, as by superposition or addition, and are then applied to the vertical deflecting plates 101 of indicator 6". Grid 37 of tube 6 is suitably biased to produce a beam trace. There will thereby be produced on the cathode ray screen of indicator 6" an indication similar to that shown in Fig. 13A, in which representations of the received pulses, such as 36, are superposed on a step 102 derived from and representative of the square wave output of wave squarer 97. The position of this step 102 relative to the received pulses 36 is under the control of the setting of phase shifter 96, since, as described above, the phase of the output of wave squarer 97 with respect to the received pulses 36 may be adjusted by phase shifter 96.

In operation, the operator will choose a suitable one of these pulses 36 corresponding to the target he wishes to attack, and will then match up the range index step 102 with the desired pulse. In order to effect this result he must suitably adjust the phase shifter 96. Preferably, this adjustment is made by means of a foot pedal such as 10, to which is also coupled mechanically the range input of computer 7. The amount of phase shift produced in phase shifter 96 to match the range index 102 with the desired received pulse 36 will be proportional to the actual range of the target. Hence, it is merely necessary to directly couple pedal 10 or other means operable with phase-adjusting means 96 into the computer 7 to actuate the computer range control in the desired manner.

Figure 14:
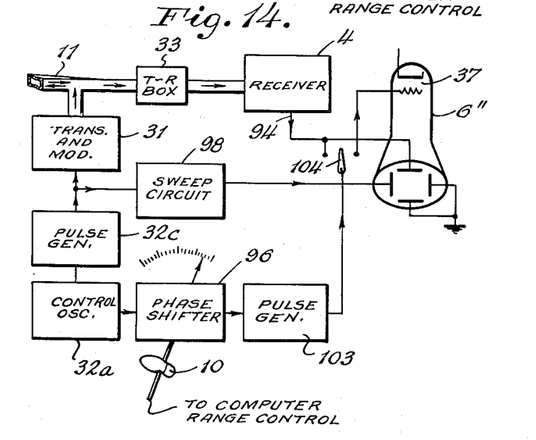
Fig. 14 shows a modification of the range indicating system of Fig. 13.

Fig. 14 shows a modification of Fig. 13. Here the transmitting and receiving circuits are the same as in Fig. 13. However, control oscillator 32a and adjustable phase shifter 96 serve to actuate a suitable pulse generator 103 adapted to produce a pulse of fixed magnitude and of predetermined duration. The duration of this pulse is preferably chosen to be substantially of the order of the duration of the reflected pulses, or slightly longer.

Figure 14A:
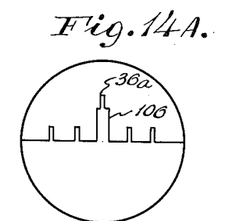
Figs. 14A and 14B show alternative types of indication produced by the system of Fig. 14.

With switch 104 thrown to the left position, this pulse output of pulse generator 103 is combined with the output 94 of receiver unit 4 in a manner similar to that of Fig. 13, resulting in the indication shown in Fig. 14A, in which the output of pulse generator 103 provides a type of pedestal representation 106 which, when matched to the desired received pulse representation, such as 36a, assures the proper setting of the range input to the computer 7. If desired, pedestal 106 may be made negative resulting in a somewhat modified indication.

Figure 14B:
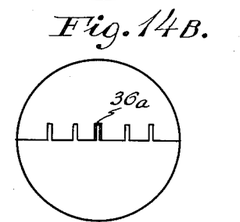

When switch 104 is thrown to the right position, a different type of indication is provided, shown in Fig. 14B. In this instance, the vertical deflecting plates of indicator 6" are controlled solely by the received wave envelope 36 obtained from output 94 of receiver 4. The pulse output of generator 103 is now applied to the intensity control grid 37 of indicator 6. Therefore, during the occurrence of these pulses, the intensity of the cathode ray beam is made greater than its intensity during the remaining portions of the sweep.

Thus, as shown in Fig. 14B, to perform range tracking the operator or gunner will adjust phase shifter 96, and hence the computer range setting, by means of range pedal 10 until the particular reflected pulse 36a corresponding to the desired target is indicated on the indicator screen with increased intensity or brightness, as shown in Fig. 14B.

The type of range control illustrated in Figs. 12, 13, and 14, is particularly adapted for use during both the manual tracking and semi-automatic tracking operations, illustrated in Figs. 2 and 3.

Although the apparatus of the present invention has been described, for exemplary purposes, as embodied in a radar ranging system involving the transmission from and reception of radio waves at the same location, it is to be understood that the apparatus may as well be employed in systems wherein the two waves to be phase compared are radiated from locations remote from the receiver. Thus a local index wave is generated in timed relation to one of the received waves and compared as to position with the other wave on a cathode ray tube.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for positioning a member in accordance with the range of a distant object comprising antenna means for radiating a wave of electromagnetic energy and for receiving energy reflected from said object, a receiver for supplying an output wave corresponding to said received energy, a cathode ray tube including vertical and horizontal beam-deflected means therefor and means for providing a base trace on the face thereof in timed relation with said radiated wave, means for producing a local index wave synchronously with said radiated wave, said index wave being a square wave of a length appreciably greater than the length of said transmitted wave such that said index wave and said receiver output wave when applied to said deflecting means of said cathode ray tube form traces representative thereof, said index wave representation having a substantially flat top portion displaced from and substantially parallel to said base trace and said output wave representation being in the form of a pip extending substantially perpendicularly from said base trace, said waves being relatively adjustable by an operator over the entire base trace to place the received wave representation at a desired location on and along the top portion of said index wave representation, means for applying said index wave and said receiver output wave to said beam deflecting means of said cathode ray tube, adjustable phase shifting means for shifting the phase relation between said received wave and said local index wave, and a member for adjusting said phase shifting means whereby said receiver output wave representation may be placed at a prescribed location on said flat top portion of said index wave representation thereby producing an accurate phase comparison of said waves and an accurate positioning of said member in accordance with the range of said object.

2. Apparatus as set forth in claim 1, wherein said index square wave is of a length greater than the length of said receiver output wave but is shorter than said base trace such as to thereby form a flat-topped pedestal representation, and said prescribed position is on the flat top of said pedestal.

3. Apparatus as set forth in claim 1, wherein said index square wave is of a length much greater than said receiver output wave and greater than the length of said base trace such that the representation thereof is in the form of a step in said base trace and said prescribed position is on the edge of said step.

4. Apparatus for measuring the range of a distant object comprising means for transmitting a periodic pulse wave of electromagnetic energy, means responsive to pulses reflected by said object for supplying output pulses corresponding thereto, a cathode ray tube having vertical and horizontal beam-deflecting means therefor and means connected with said horizontal deflection means for producing a substantially linear base trace across the diameter of said tube face in timed relation with said transmitted pulse wave, means for producing a local index wave in timed relation to the transmitted pulse wave, said index wave being a square wave of a length greater than the length of said transmitted pulse wave such that said index wave and said receiver output pulse when applied to said vertical deflecting means form traces representative thereof, said index wave representation having a flat top portion displaced from and parallel to said base trace and said output wave representation being in the form of a pip extending substantially perpendicularly from said base trace, said waves being relatively adjustable by an operator over the entire base trace to place said received pulse representation at a desired location on and along said top portion of said index wave representation, means for applying said index wave and said output pulse to said vertical beam-deflecting means of said cathode ray tube, means for adjusting the phase relation between said local index wave and said transmitted wave whereby said local index wave representation and said received pulse representation may be relatively shifted to place said received pulse representation at said prescribed position on said index wave, and means operable with said phase-adjusting means for providing a measure of the range of said object when said local wave and said received pulse are so positioned.

5. Apparatus as in claim 4 wherein said index wave comprises a pedestal voltage wave having a flat top, the length of said pedestal wave being greater than the length of said received pulse but less than said base trace such that the entire wave is represented on the face of said cathode ray tube and said prescribed position of said received pulse representation relative thereto is on the flat top thereof.

6. Apparatus as set forth in claim 4, wherein said index square wave is of a length much greater than said receiver output wave and greater than the length of said base trace such that the representation thereof is in the form of a step in said base trace and said prescribed position is on the edge of said step.

7. Apparatus for determining the time difference between a first radio wave and a second radio wave related in time to said first radio wave including a cathode ray tube having vertical and horizontal beam-deflecting means therefor and means connected with said horizontal deflecting means for producing a substantially linear base trace across said tube face in timed relation with said first wave, means for producing a local index wave in timed relation to said first wave, said index wave being a square wave of a length greater than the length of said second wave such that said index wave and said second wave when applied to said vertical deflection means of said cathode ray tube form traces representative thereof, said index wave representation having a flat top portion displaced from and parallel to said base trace and said second wave representation being in the form of a pip extending substantially perpendicularly from said base trace, said waves being relatively adjustable by an operator over the entire base trace to place said second wave representation at a desired position on and along said index wave representation, means for applying said index wave and said second wave to said vertical beam-deflecting means of said cathode ray tube, means for adjusting the phase relation between said index wave and said second wave whereby said index wave and said second wave representations may be relatively shifted to place said second wave representation at a prescribed position on said flat top portion of said index wave representation, and means operable with said phase-adjusting means for providing a measure of the time difference between said first wave and said second wave when said index wave representation and said second wave representation are so positioned.

8. Apparatus as claimed in claim 7 wherein said local index wave comprises a pedestal voltage wave having a flat top, the length thereof being greater than the length of said second wave but less than the length of said base trace such that the entire wave representation is visible on the face of said cathode ray tube and said prescribed position of said second wave representation is on the flat top thereof.

9. Apparatus as claimed in claim 7 wherein said local wave is of a length much greater than the length of said second wave and the length of said base trace such that when applied to the vertical deflection means of said cathode ray tube a representation of only one end thereof is visible to thereby produce an indication of stepped configuration and said prescribed position of said second wave representation is on the edge of the step produced by said local wave.

References Cited in the file of this patent

UNITED STATES PATENTS

| | | |
|---|---|---|
| 2,403,278 | Hershberger | July 2, 1946 |
| 2,405,238 | Seeley | Aug. 6, 1946 |
| 2,405,239 | Seeley | Aug. 6, 1946 |
| 2,409,462 | Zworykin | Oct. 15, 1946 |
| 2,423,082 | Busignies | July 1, 1947 |
| 2,432,196 | Hershberger | Dec. 9, 1947 |
| 2,450,341 | Hershberger | Sept. 28, 1948 |
| 2,453,970 | Charrier | Nov. 16, 1948 |